United States Patent
Weshendorff

(10) Patent No.: US 7,445,219 B2
(45) Date of Patent: Nov. 4, 2008

(54) WHEEL SUSPENSION SYSTEM FOR A MOTOR VEHICLE

(75) Inventor: Joerg Weshendorff, Witten (DE)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 10/811,700

(22) Filed: Mar. 29, 2004

(65) Prior Publication Data

US 2004/0217570 A1 Nov. 4, 2004

(30) Foreign Application Priority Data

Mar. 28, 2003 (EP) .................................. 03100824

(51) Int. Cl.
B60G 7/02 (2006.01)
B60G 3/04 (2006.01)
B60G 15/00 (2006.01)
B60G 13/00 (2006.01)
B62D 21/11 (2006.01)

(52) U.S. Cl. .................. 280/124.109; 280/124.134; 280/124.146; 280/24.147; 280/124.154; 280/124.145

(58) Field of Classification Search .......... 280/124.109, 280/124.134, 124.146, 124.147, 124.154, 280/124.145
See application file for complete search history.

(56) References Cited

U.S. PATENT DOCUMENTS

| | | | | |
|---|---|---|---|---|
| 2,842,230 A | * | 7/1958 | MacPherson | 188/322.16 |
| 2,935,334 A | * | 5/1960 | Felts | 280/124.147 |
| 2,967,066 A | * | 1/1961 | Mueller | 280/124.145 |
| 3,362,498 A | * | 1/1968 | Allison | 180/360 |
| 3,380,754 A | * | 4/1968 | Rauls | 280/124.134 |
| 3,831,967 A | * | 8/1974 | Uhlenhaut et al. | 280/124.109 |
| 4,046,403 A | * | 9/1977 | Yoshida | 280/124.145 |
| 4,159,125 A | * | 6/1979 | Buchwald | 280/124.146 |
| 4,561,640 A | * | 12/1985 | Enke et al. | 267/248 |
| 4,567,637 A | * | 2/1986 | Pees et al. | 29/402.08 |
| 4,620,720 A | * | 11/1986 | Sakata et al. | 280/124.145 |
| 4,671,531 A | * | 6/1987 | Sautter et al. | 280/124.109 |
| 4,771,996 A | * | 9/1988 | Martinez et al. | 267/220 |
| 4,840,396 A | * | 6/1989 | Kubo | 280/124.143 |
| 4,989,894 A | * | 2/1991 | Winsor et al. | 280/124.109 |
| 5,005,857 A | * | 4/1991 | Camuffo | 280/124.109 |
| 6,357,772 B1 | * | 3/2002 | Pelz et al. | 280/124.143 |
| 7,040,639 B2 | * | 5/2006 | Tamura | 280/124.147 |
| 2005/0140110 A1 | * | 6/2005 | Lee et al. | 280/124.109 |

FOREIGN PATENT DOCUMENTS

| | | | |
|---|---|---|---|
| DE | 3729238 A | * | 3/1989 |
| DE | 100 18 058 A | | 10/2001 |
| DE | 101 09 636 A | | 9/2002 |
| EP | 1 188 643 A1 | | 3/2002 |
| JP | 2000 255236 A | | 1/2001 |
| WO | WO-9838055 A | * | 9/1998 |

* cited by examiner

Primary Examiner—Kevin Hurley
Assistant Examiner—Joselynn Y. Sliteris
(74) Attorney, Agent, or Firm—O'Brien Jones, PLLC

(57) ABSTRACT

The invention relates to a wheel suspension system for a motor vehicle, having a lower link for the fastening of a wheel which is coupled to a chassis underframe and is supported on the body via a spring. The chassis underframe is mounted on the body via elastic bearings and has an annular mounting on which the spring plate of the spring is supported before the wheel suspension system is installed. In the fitted state, the spring plate is pressed out of the mounting by the body and is therefore decoupled from the chassis underframe.

10 Claims, 3 Drawing Sheets

WHEEL SUSPENSION SYSTEM FOR A MOTOR VEHICLE

TECHNICAL FIELD

The invention relates to a wheel suspension system for a motor vehicle, containing a lower link for the attachment of a wheel, a chassis underframe mounted on the body and a spring. The invention furthermore relates to a method for installing a wheel suspension system of this type.

BACKGROUND OF THE INVENTION

In particular for the rear wheels of motor vehicles, individual wheel suspension systems are known, in which the wheels are attached to a "lower" (transverse) link. In order to damp the transmission of noises and vibrations to the body, the lower link in this case is frequently not fastened directly to the body, but rather to a chassis underframe, (e.g., intermediate frame or auxiliary frame) which, for its part, is fastened to the longitudinal member of the body via rubber bearings. Furthermore, in the case of a wheel suspension system of this type, a helical spring, the upper end of which is supported on the chassis underframe via a spring, plate, is mounted on the lower link.

In the case of the conventional wheel suspension system described above, all of the forces transmitted between the wheel and body pass via the chassis underframe, which constitutes a considerable load for the rubber bearings thereof. For this reason, modifications of the wheel suspension system are known, in which the spring is not supported on the chassis underframe by the spring plate, but rather is supported directly on the body. The rubber bearings of the chassis underframe are thereby noticeably relieved of load. However, the installation of a wheel suspension system of this type is problematical, since the spring is free-standing before being installed on the separate wheel suspension system. Only during the installation of the wheel suspension system is the spring fitted onto the body (or alternatively, when pre-installed on the body, to the lower link), in which case it is possible for the spring to become detached and injure the installers. Furthermore, during fitting of the relatively long and stiff springs, the body is lifted off from the installation mountings. This also leads to a considerable risk of accident.

Against this background, it is desired to provide a wheel suspension system with a spring which is supported on the body and which is easier to fit.

SUMMARY OF THE INVENTION

The wheel suspension system according to the invention for a motor vehicle contains a link (or "lower link" below in accordance with the installation position) which has means for the rotatable attachment of a wheel. Furthermore, the wheel suspension system contains a chassis underframe having bearings for fastening the chassis underframe to the body of a motor vehicle. The link or lower link, in accordance with the installation position, is preferably connected to the chassis underframe in an articulated manner. The chassis underframe typically extends over the width of the vehicle, so that a wheel suspension system can be formed at both ends in each case. The wheel suspension system according to the invention furthermore contains a (helical) spring, the one end of which (called "lower end" below in accordance with the installation position) is arranged on the lower link and the other ("upper") end of which is covered by a spring plate. The wheel suspension system further includes the chassis underframe having a mounting on which part of the spring plate is supported when the wheel suspension system is not (yet) fitted on the body of a motor vehicle.

The effect achieved by the mounting formed on the chassis underframe and its interaction with the spring plate is that, even when the wheel suspension system is removed, the spring is not completely free-standing, but rather is securely clamped between the lower link and mounting of the chassis underframe. The installation procedure for a wheel suspension system of this type can therefore essentially proceed in the same manner as in the case of wheel suspension systems in which the spring sits permanently (i.e. even in the fitted state) between the lower link and chassis underframe. Neither another configuration of the installation station nor a change of the installation sequence is therefore required. Since only part of the spring plate is supported on the mounting, the exposed part of the spring plate can enter into contact with the body during the installation and, when the final installation position is reached, can take over the actual transmission of force from the spring. This means that, in the fitted state, the spring plate is lifted off from the mounting of the chassis underframe and there is therefore no longer any coupling between the spring and chassis underframe, which has the advantages mentioned in relation to relieving the bearings of the chassis underframe from load.

The mounting which is attached to the chassis underframe is preferably of annular design, so that said mounting can annularly surround the spring plate and the latter can be supported by its (if appropriate widened) edge on the mounting. A uniform, secure and centered mounting of the spring plate on the mounting can thereby be achieved.

The spring plate is preferably provided with a centering extension which, in the installation state, points in the direction of the body. With a centering extension of this type and a corresponding centering hole on the body, it can be ensured that the spring "automatically" assumes a defined position on the body during installation.

Furthermore, the spring plate can be combined with the support of an additional spring (spring aid) in order to achieve a particularly compact construction.

The bearings of the chassis underframe can be formed by elastomeric elements which ensure good damping of noises and vibrations with respect to the body. The chassis underframe is preferably supported on each side of the motor vehicle via two bearings, i.e. in total via four bearings.

The lower link is preferably a transverse link.

The invention furthermore relates to a method for installing a wheel suspension system comprising the following steps. First, having a lower link for the attachment of a wheel, a chassis underframe having at least one pair of bearings for fastening to a body of a motor vehicle, and a spring having a lower end and an upper end. The lower end of the spring is arranged on the link and the upper end of the spring is arranged in a spring plate. The chassis underframe has a mounting on which part of the spring plate is supported when the wheel suspension system is not fitted on the body of a motor vehicle such that the spring is supported on the mounting of the chassis underframe via the spring plate. The spring is therefore not free-standing, and the wheel suspension system is situated in a prepared, stable state. Second, fitting the wheel suspension system onto the body of a motor vehicle in such a manner that the spring plate is supported on the body. This is possible since the spring plate is only partially supported on the mounting and therefore still has free contact surfaces for supporting on the body. The positioning of the spring plate on the body is preferably assisted by a centering extension on the spring plate and a corresponding centering opening on the body. Third, fastening the chassis underframe to the body of the motor vehicle, in which case the spring is compressed and the spring plate is lifted off from the mounting of the chassis underframe. The fastening can take place, in particular, with the aid of screw bolts.

The method described has the advantage that the wheel suspension system can be fitted essentially in the manner of a conventional wheel suspension system in which the spring is permanently supported on the chassis underframe. Nevertheless, owing to the spring plate lifting off from the mounting in the third step, in the fitted state, a direct coupling of force between the lower link and body is achieved, in which case the spring is independent of the chassis underframe.

In the method, the chassis underframe and the spring plate are preferably attached to or mounted on a longitudinal member of the body, so that the wheel, forces are introduced into the body in a particularly uniform manner.

With the provision of the wheel suspension system in first step, said system is preferably situated in an installation aid, so that the wheel suspension system can be securely handled. In this case, the installation aid has to permit the wheel suspension system to lift up as it is being fitted onto the body in the second step.

Other advantages and features of the present invention will become apparent when viewed in light of the detailed description of the preferred embodiment when taken in conjunction with the attached drawings and appended claims.

BRIEF DESCRIPTION OF THE DRAWINGS

The invention will be explained in greater detail below by way of example with the aid of the figures, in which.

DETAILED DESCRIPTION OF THE PREFERRED EMBODIMENT

Figure 1:
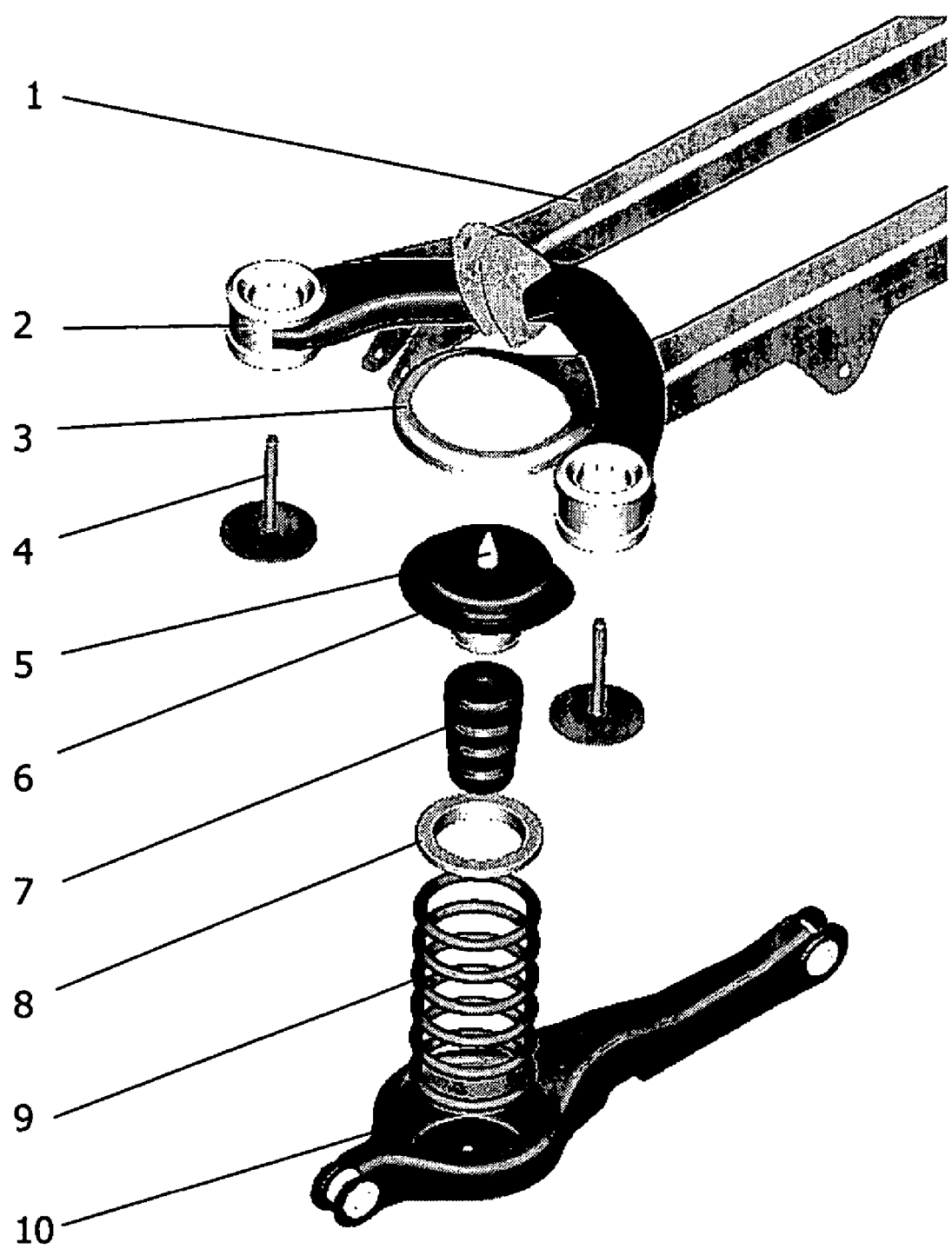
FIG. 1 shows an exploded illustration of the wheel suspension system according to the invention.

FIG. 1 shows an exploded illustration of the wheel suspension system according to one embodiment of the invention. Said wheel suspension system essentially comprises a chassis underframe 1, only one end of which is illustrated in the figure. The chassis underframe 1 extends over the width of a motor vehicle and is of mirror-symmetrical design at both ends. At the illustrated end of the chassis underframe 1, a pair of rubber bearings 2 can be seen via which the chassis underframe 1 is mounted on the body of a motor vehicle (not illustrated in FIG. 1) and can be fastened there with the aid of screw bolts 4 having a wide head.

The wheel suspension system furthermore comprises a lower link 10 which supports (in a manner not illustrated specifically) the wheel which is to be suspended. In the pre-fitted state of the wheel suspension system, the link 10 is coupled by its end which is on the right in the figure to the chassis underframe 1 in an articulated manner. Furthermore, the link 10 has a widened section with a depression in which the lower end of a helical spring 9 is mounted.

The helical spring 9 is supported by its upper end on the lower side of a spring plate 6 with the connection in-between of an insulation ring 8. In the pre-fitted state of the wheel suspension system, the widened edge of the spring plate 6 bears with its upper side against an annular mounting 3 which is integrally formed on the chassis underframe 1, so that the spring 9 is fixed between the lower link 10 and chassis underframe 1 in a pre-stressed state.

A centering extension 5 on the upper side of the spring plate 6 and a spring aid 7 which is secured on the lower side of the spring plate 6 can furthermore be seen in FIG. 1. Such a dual function of the spring plate 6 as a support for the spring 9 and for the spring aid 7 is, however, not absolutely necessary, since the spring aid 7 may also be supported at a different point, for example on a supporting bar (not illustrated), of the wheel suspension system.

Figure 2:
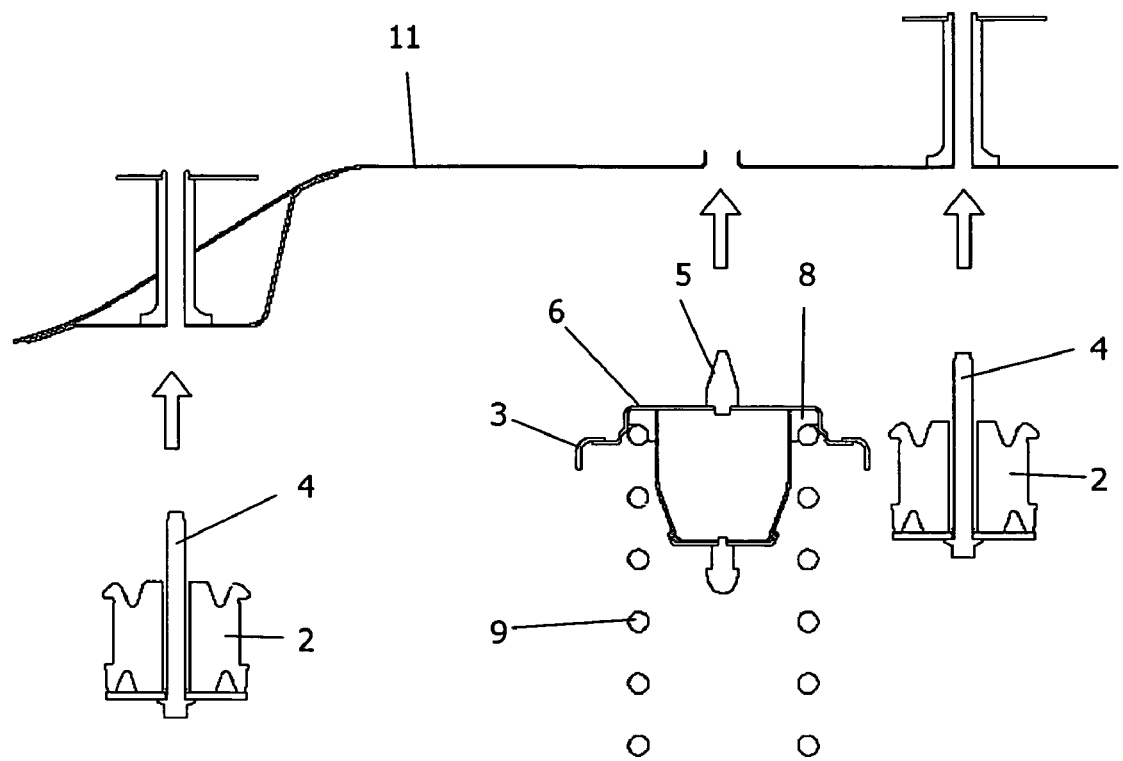
FIG. 2 shows a schematic section through the wheel suspension system at the beginning of the installation.
Figure 3:
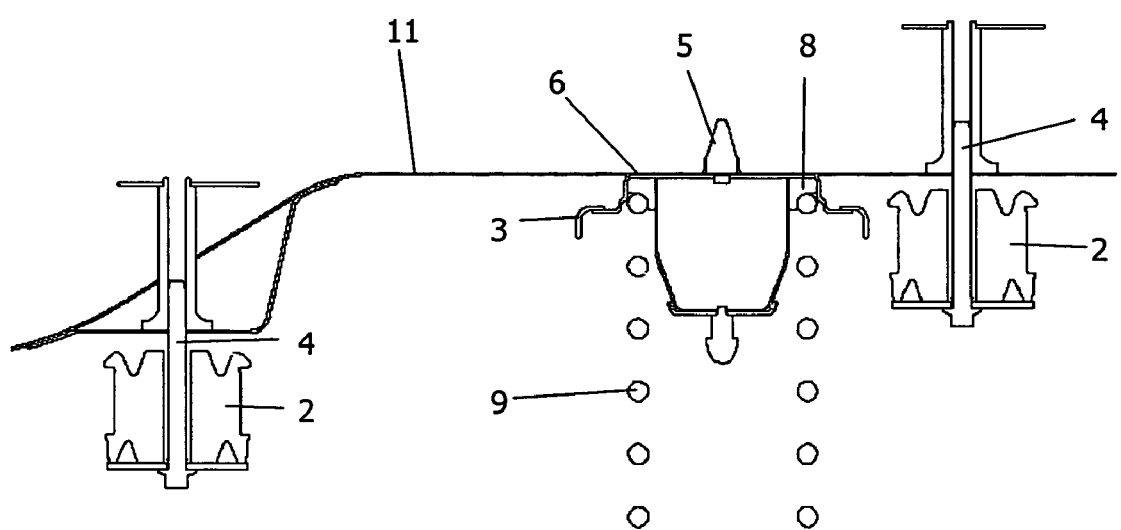
FIG. 3 shows a section corresponding to FIG. 2 in an intermediate stage of the installation.
Figure 4:
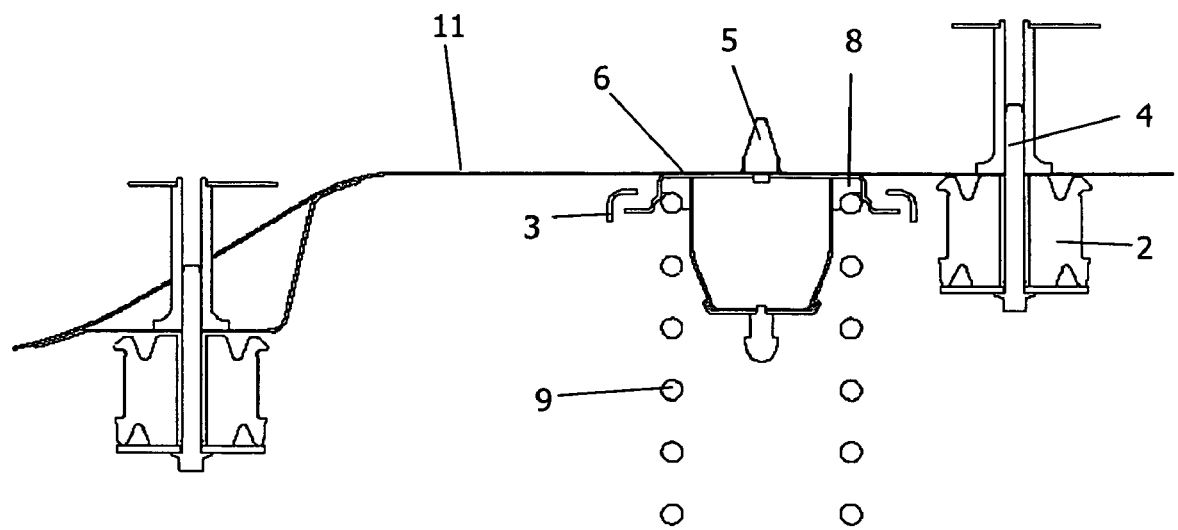
FIG. 4 shows a section corresponding to FIG. 2 at the end of the installation.

FIGS. 2, 3 and 4 each show a schematic section in the longitudinal direction of a motor vehicle through the wheel suspension system according to the invention and through the longitudinal member 11 of the motor vehicle in consecutive stages of the installation. The same reference numbers as in FIG. 1 represent the same parts, so they will not be explained again.

FIG. 2 illustrates the first step of the installation of a wheel suspension system according to the invention on a motor vehicle. The pre-fitted wheel suspension system is provided on an installation aid (not illustrated) on which said system is secured over the chassis underframe with securing means such as "C-hooks". Since the spring 9 supports the edge of the spring plate 6 on the mounting 3 of the chassis underframe, there is no free-standing spring which could lead to problems during the installation. The annular mounting 3 of the chassis underframe secures the arrangement, comprising the spring plate 6, which also includes the support for the spring aid, and the insulation ring 8, in a centered position and prevents it from falling apart.

The installation is therefore continued in that the installation aid lifts off the wheel suspension system in the direction of the arrows toward the body, of which the longitudinal number 11 is indicated. In this case, a pre-setting of the position of the axis with respect to the body can take place via installation pins.

FIG. 3 shows an intermediate stage of the installation process in which the centering extension 5 has found the associated hole, which is surrounded by a flange, in the longitudinal member 11 and, as it passes through it, has thereby centered the wheel suspension system. The automatic centering of the wheel suspension system enables rapid installation without risky manual interventions to take place. In the illustrated state, the wheel suspension system has been lifted up precisely until the upper side of the spring plate 6 comes into contact with the lower side of the longitudinal member 11. At this moment, the screw bolts 4 are also pushed through corresponding holes in the rubber sleeves 2 of the chassis underframe and are screwed into the associated threads on the longitudinal member 11. There is initially still a gap between the rubber sleeves 2 and the longitudinal member 11.

FIG. 4 shows the end of the installation process. The bolts 4 have been tightened against the weight of the wheel suspension system and the clamping force of the spring 9 and have been completely screwed into their threads, in which case they press the wheel suspension system against the longitudinal member 11 and close the previously existing gap between the rubber sleeves 2 and the longitudinal member 11. An important feature is that, when the chassis underframe is lifted up, its mounting 3 is lifted off from the spring plate 6, which is secured by the longitudinal member 11. There is therefore no longer any coupling between the spring 9 and the chassis underframe.

Since, with the tightening of the screw bolts 4 to a desired torque, the installation is finished, the installation aid and additional tool (not illustrated) can be removed. An advantageous feature of the installation process is that it can be executed in a conventional installation station and with the known installation steps.

Figure 5:
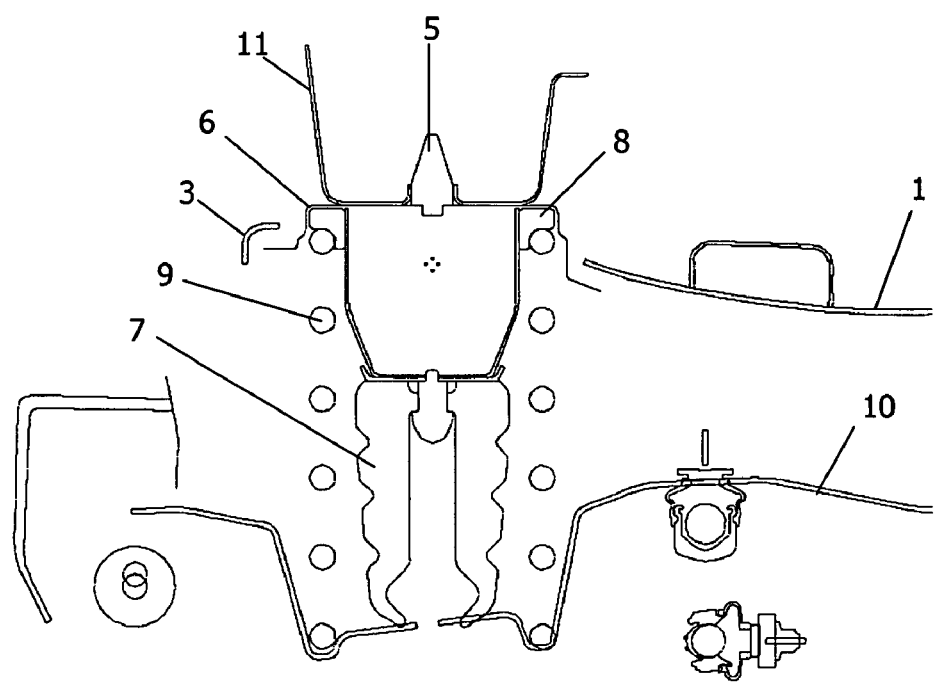
FIG. 5 shows a section through the finally fitted wheel suspension system perpendicular with respect to the direction of the section of FIG. 4.

FIG. 5 shows a cross section through the finally fitted wheel suspension system in a direction perpendicular to the sections of FIGS. 2 to 4. The spring aid 7 can additionally also be seen on the wheel suspension system in this case.

The wheel suspension system according to the invention therefore enables a direct coupling (in the fitted state) of the lower link 10 onto the body 11 without this leading to problems or risks during the installation. This result is achieved by the mounting 3 on the chassis underframe 1, said mounting receiving the spring 9 in the pre-fitted state of the wheel suspension system.

While particular embodiments of the invention have been shown and described, numerous variations and alternate embodiments will occur to those skilled in the art. Accordingly, it is intended that the invention be limited only in terms of the appended claims.

What is claimed is:

1. A wheel suspension system for a motor vehicle, comprising:
   a lower link for attachment of a wheel;
   a spring having a lower end and an upper end, the lower end being arranged on the link and the upper end being arranged in a spring plate having a centering extension; and
   a chassis underframe having a mounting annularly surrounding the spring plate for support, and the chassis underframe having at least one pair of bearings for fastening to the body,
   wherein the mounting is configured to support the spring plate when the suspension is not fitted to the body of the motor vehicle.

2. The wheel suspension system of claim 1, wherein the spring plate is combined with the support of a spring aid.

3. The wheel suspension system of claim 1, wherein at least one pair of bearings of the chassis underframe is formed by elastomeric elements.

4. The wheel suspension system of claim 1, wherein the spring plate is combined with the support of a spring aid and at least one pair of bearings of the chassis underframe is formed by elastomeric elements.

5. The wheel suspension system of claim 4, wherein the lower link is a transverse link.

6. The wheel suspension system of claim 1, wherein the lower link is a transverse link.

7. The wheel suspension system of claim 1, wherein the spring plate is combined with the support of a spring aid and the lower link is a transverse link.

8. The wheel suspension system of claim 1, wherein at least one pair of bearings of the chassis underframe is formed by elastomeric elements and the lower link is a transverse link.

9. A method for installing a wheel suspension system, comprising:
   providing a wheel suspension system having a lower link for attachment of a wheel, a chassis underframe having at least one pair of bearings for fastening to a body of a motor vehicle, and a spring having a lower end and an upper end, the lower end of which is arranged on the link and the upper end of which is arranged in a spring plate, wherein the chassis underframe has a mounting on which part of the spring plate is supported when the wheel suspension system is not fitted on the body of a motor vehicle;
   fitting the wheel suspension system onto the body of a motor vehicle so that the spring plate is supported on the body; and
   fastening the chassis underframe to the body of the motor vehicle, the spring being compressed and the spring plate separating from the mounting of the chassis underframe.

10. The method of claim 9, wherein the chassis underframe and the spring plate are mounted on a longitudinal member of the body.

* * * * *